United States Patent
Hong et al.

(10) Patent No.: US 12,398,161 B2
(45) Date of Patent: Aug. 26, 2025

(54) CONTINUOUS PREPARATION METHOD FOR PENEM INTERMEDIATE MAP

(71) Applicant: JILIN ASYMCHEM PHARMACEUTICALS CO., LTD., Jilin (CN)

(72) Inventors: Hao Hong, Morrisville, NC (US); Gage James, Morrisville, NC (US); Chaoyong Chen, Tianjin (CN); Jiangping Lu, Tianjin (CN); Yong Jiang, Tianjin (CN); Jian Tao, Tianjin (CN); Yong Luo, Tianjin (CN)

(73) Assignee: JILIN ASYMCHEM PHARMACEUTICALS CO., LTD., Jilin (CN)

( * ) Notice: Subject to any disclaimer, the term of this patent is extended or adjusted under 35 U.S.C. 154(b) by 791 days.

(21) Appl. No.: 17/626,790

(22) PCT Filed: Oct. 28, 2019

(86) PCT No.: PCT/CN2019/113744
§ 371 (c)(1),
(2) Date: Jan. 12, 2022

(87) PCT Pub. No.: WO2021/081714
PCT Pub. Date: May 6, 2021

(65) Prior Publication Data
US 2022/0315615 A1   Oct. 6, 2022

(51) Int. Cl.
*C07F 9/6561* (2006.01)
*B01J 8/02* (2006.01)
*B01J 31/22* (2006.01)

(52) U.S. Cl.
CPC .......... *C07F 9/6561* (2013.01); *B01J 8/0278* (2013.01); *B01J 31/2226* (2013.01);
(Continued)

(58) Field of Classification Search
CPC .......... B01J 2231/324; B01J 2231/4283; B01J 2531/0219; B01J 2531/822; B01J 31/08;
(Continued)

(56) References Cited

FOREIGN PATENT DOCUMENTS

| CN | 102153554 A | 8/2011 |
|----|-------------|--------|
| CN | 104262523 A | 1/2015 |

(Continued)

OTHER PUBLICATIONS

International Search Report issued in connection with Application No. PCT/CN2019113744 dated Jun. 30, 2020.

*Primary Examiner* — Dirk R Bass
(74) *Attorney, Agent, or Firm* — Dennemeyer & Associates LLC

(57) ABSTRACT

The present disclosure discloses a continuous preparation method for a penem intermediate MAP. The continuous preparation method includes the following steps: step S1, in a column-type continuous reactor, using a rhodium-loaded catalyst to catalyze 4-nitrobenzyl(R)-2-diazo-4-((2R,3S)-3-((R)-1-hydroxyethyl)-4-oxoazetidin-2-yl)-3-oxopentanoate to generate a cyclization reaction so as to form a first intermediate, herein the rhodium-loaded catalyst is loaded in the column-type continuous reactor, and the rhodium-loaded catalyst has the following structural formula:

$$(P-COO)_x-RH_2(OOCR^1)_{4-x};$$

step S2, performing an esterification reaction on the first intermediate, a diphenyl chlorophosphate and a diisopropylethylamine in a second continuous reactor, to obtain a product system containing the penem intermediate MAP;

(Continued)

and step S3, performing crystallization treatment on the product system, to obtain the penem intermediate MAP.

8 Claims, 5 Drawing Sheets

(52) U.S. Cl.
 CPC .... *B01J 2231/324* (2013.01); *B01J 2531/822* (2013.01); *C07B 2200/13* (2013.01)

(58) Field of Classification Search
 CPC .. B01J 31/165; B01J 31/2226; B01J 31/2239; B01J 8/0278; C07B 2200/13; C07F 9/6561
 See application file for complete search history.

(56) References Cited

FOREIGN PATENT DOCUMENTS

| | | | |
|---|---|---|---|
| CN | 108948086 | A | 12/2018 |
| CN | 109876747 | A | 6/2019 |
| CN | 110790790 | A | 2/2020 |
| JP | 2016538400 | A | 12/2016 |
| KR | 20100044631 | A | 4/2010 |
| KR | 20160091948 | A | 8/2016 |

CONTINUOUS PREPARATION METHOD FOR PENEM INTERMEDIATE MAP

TECHNICAL FIELD

The present disclosure relates to the technical field of preparation of penem intermediates, in particular to a continuous preparation method for a penem intermediate MAP.

BACKGROUND

Penem antibiotics, namely carbapenem antibiotics, belong to β-lactam antibacterial drugs, it has the strong antibacterial activity and a broad antibacterial spectrum. This drug is clinically suitable for treatment of the following moderate and severe infections caused by sensitive bacteria: complicated abdominal cavity infection, complicated skin and soft tissue infection, community-acquired pneumonia, complicated urinary tract infection, acute pelvic infection, severe enterobacteriaceae bacterial infection and the like. Therefore, the drug has a broad application prospect.

At present, an industrial scale-up production technology mainly uses batch chemical technology production (namely batch reaction production). A solvent, a raw material and a rhodium catalyst are put into a reaction kettle in sequence, and the temperature is raised to perform a cyclization reaction. After an obtained intermediate is cooled, a diphenyl chlorophosphate and a diisopropylethylamine are sequentially added to perform an esterification reaction at a low temperature. After the system is subjected to post-treatment operations such as quenching and crystallizing, a penem intermediate MAP is obtained. The patent application with application publication number CN108948086A discloses a process for continuous synthesis of a penem antibiotic parent nucleus MAP, in which methyl tert-butyl ketone is used as a solvent to dissolve (3S,4R)-3-((R)-1-hydroxyethyl)-4-((1R)-1-methyl-3-diazo-3-p-nitrobenzyloxyformyl-2-one-propyl)-2-azetidinone, rhodium octanoate dimer is used as a catalyst, and the intermediate is prepared by a continuous reaction in a first-level pipeline reactor; and the diphenyl chlorophosphate and N,N-diisopropylethyl ammonia are mixed to form a mixture II, and the intermediate is cooled and continuously reacts with the mixture II in a two-level pipeline reactor to prepare the penem antibiotic parent nucleus MAP. However, the reaction temperature in the one-level pipeline reactor of this process is 80~100° C. to achieve a higher product yield, but the reaction temperature in the two-level pipeline reactor is between −25~−5° C., and the temperature difference between the two is larger, therefore the intermediate needs to be cooled, so that the energy consumption is higher, especially while it is scaled up to an industrial application, it is caused that the production cost of MAP is larger, and the economic benefits for producers are reduced.

SUMMARY

A main purpose of the present disclosure is to provide a continuous preparation method for a penem intermediate MAP, as to solve a problem in an existing technology that a process of continuously preparing the penem intermediate MAP is high in energy consumption.

In order to achieve the above purpose, according to one aspect of the present disclosure, a continuous preparation method for a penem intermediate MAP is provided, comprising: step S1, in a column-type continuous reactor, using a rhodium-loaded catalyst to catalyze 4-nitrobenzyl(R)-2-diazo-4-((2R,3S)-3-((R)-1-hydroxyethyl)-4-oxoazetidin-2-yl)-3-oxopentanoate to generate a cyclization reaction so as to form a first intermediate, wherein the rhodium-loaded catalyst is loaded in the column-type continuous reactor, and the rhodium-loaded catalyst has the following structural formula:

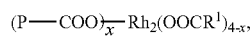

$$(P-COO)_{\overline{x}}-Rh_2(OOCR^1)_{4-x},$$

wherein $R^1$ represents any one alkyl of C1-C10; P—COO— represents a residue of a polymer after dehydrogenation, and x represents an arbitrary number of 0.1-4.0; step S2, performing an esterification reaction on the first intermediate, a diphenyl chlorophosphate and a diisopropylethylamine in a second continuous reactor, to obtain a product system containing the penem intermediate MAP; and step S3, performing crystallization treatment on the product system, to obtain the penem intermediate MAP.

Further, the column-type continuous reactor comprises a reacting column, and installed from bottom to top, the reacting column comprises: a feeding section, provided with a liquid inlet, and a liquid distributing device is installed above the liquid inlet; a reacting section, wherein the reacting section is isolated from the feeding section through a porous bottom plate, the reacting section is internally filled with an inert filler and the rhodium-loaded catalyst and provided with multiple circumferentially arranged first separating plates, and each of the first separating plate is extended along a vertical direction so that a cavity of the reacting section is separated to multiple first reacting chambers; and a discharging section, wherein the discharging section is isolated from the reacting section through a porous top plate, and the discharging section is provided with a liquid-state product outlet and an exhaust port.

Further, a second separating plate is further installed in the cavity of the reacting section, the second separating plate is a cylinder-like separating plate coaxially installed with the reacting column, the cavity of the reacting section is separated to an inner reacting chamber and an outer reacting chamber by the second separating plate, and the first separating plate is installed in the outer reacting chamber so that the outer reacting chamber is separated to the multiple first reacting chambers.

Further, in the structural formula, $R^1$ represents the alkyl of C1-C10, preferably a methyl, an ethyl, a tertiary butyl, an n-hexyl or an n-heptyl.

Further, the step S1 comprises: enabling the 4-nitrobenzyl (R)-2-diazo-4-((2R,3S)-3-((R)-1-hydroxyethyl)-4-oxoazetidin-2-yl)-3-oxopentanoate to be dissolved in a first organic solvent so as to form first raw material solution, wherein the first organic solvent is selected from arbitrary one or more from a group of ethyl acetate, methyl acetate, tetrahydrofuran, dichloromethane, trichloromethane and methyl isobutyl ketone; and feeding the first raw material solution into the column-type continuous reactor, using the rhodium-loaded catalyst to catalyze the 4-nitrobenzyl(R)-2-diazo-4-((2R,3S)-3-((R)-1-hydroxyethyl)-4-oxoazetidin-2-yl)-3-oxopentanoate to generate the cyclization reaction in 30-60° C. so as to form a first intermediate system containing the first intermediate, wherein preferably retention time of the first raw material solution in the column-type continuous reactor is 2-40 mins, preferably 4-20 mins.

Further, the step S2 comprises: pre-cooling the second continuous reactor to −32-12° C.; and respectively feeding the first intermediate system, solution of the diphenyl chlorophosphate and solution of the diisopropylethylamine into the pre-cooled second continuous reactor to perform the esterification reaction so as to obtain the product system containing the penem intermediate MAP, wherein a solvent in the solution of the diphenyl chlorophosphate and a solvent in the solution of the diisopropylethylamine are respectively and independently selected arbitrary one or more from a group consist of the ethyl acetate, methyl acetate, tetrahydrofuran, dichloromethane, trichloromethane and methyl isobutyl ketone, before performing the step S2, preferably enabling the first intermediate system obtained in the step S1 to be collected to a receiving device and pre-cooling to −12-25° C., wherein the receiving device is connected with the column-type continuous reactor and the second continuous reactor.

Further, the second continuous reactor is a one-level coiler continuous reactor or a multi-level coiler serially-connected continuous reactor, and the retention time of a reactant in the second continuous reactor is 2-40 mins, preferably 4-20 mins.

Further, the step S3 comprises: feeding the product system, a quenching agent and crystallization liquid into a third continuous reactor to perform continuous crystallization, to obtain a crystallization system, wherein the quenching agent is selected arbitrary one or more from a group consist of pure water, potassium dihydrogen phosphate buffer solution, potassium hydrogen phosphate buffer solution, sodium dihydrogen phosphate buffer solution, and sodium hydrogen phosphate buffer solution, and the crystallization liquid is selected arbitrary one or more from a group consist of hexane, heptane, octane, methyl cyclopentane and petroleum ether; and performing solid-liquid separation on the crystallization system, to obtain the penem intermediate MAP.

Further, the third continuous reactor is a one-level coiler continuous reactor or a multi-level coiler serially-connected continuous reactor.

Further, the step S3 comprises: after feeding the product system into a quenching agent for quenching, feeding a crystallization liquid into the product system to perform the crystallization, to obtain a crystallization system, wherein the quenching agent is selected arbitrary one or more from a group of pure water, potassium dihydrogen phosphate buffer solution, potassium hydrogen phosphate buffer solution, sodium dihydrogen phosphate buffer solution, and sodium hydrogen phosphate buffer solution, and the crystallization liquid is selected arbitrary one or more from a group of hexane, heptane, octane, methyl cyclopentane and petroleum ether; and performing solid-liquid separation on the crystallization system, to obtain the penem intermediate MAP.

A technical scheme of the present disclosure is applied, and the present application uses the column-type continuous reactor as a place in which the cyclization reaction occurs. Since the cyclization reaction forms the first intermediate while forming a gas-state product, the gas-state product has a disturbing effect on the rhodium-loaded catalyst in a rising process thereof in the column-type continuous reactor, thereby it is beneficial to the efficient contact of 4-nitrobenzyl(R)-2-diazo-4-((2R,3S)-3-((R)-1-hydroxyethyl)-4-oxoazetidin-2-yl)-3-oxopentanoate and the catalyst so as to improve the catalytic effect, and the rhodium-loaded catalyst of the present application uses the polymer as a carrier, so it has higher mechanical properties and catalytic activity, and is easy to recycle. Under the synergistic effect of the column-type continuous reactor and the rhodium-loaded catalyst, the cyclization reaction of the present application may be performed efficiently at a lower temperature, and the temperature difference between the cyclization reaction and the esterification reaction is reduced, thereby a cooling source required for the cooling of the first intermediate is reduced, and the energy consumption is reduced, so it is especially suitable for the industrial application.

BRIEF DESCRIPTION OF THE DRAWINGS

Drawings of the description for constituting a part of the present application are used to provide further understanding of the present invention. Exemplary embodiments of the present disclosure and descriptions thereof are used to explain the present invention, and do not constitute improper limitation to the present disclosure. In the drawings.

Figure 1:
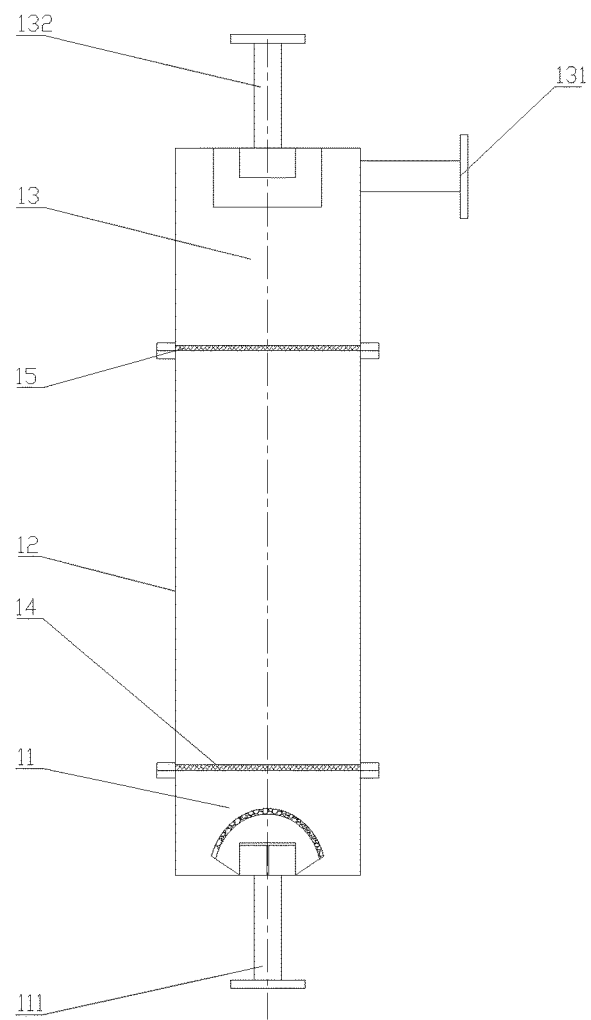
FIG. 1 shows a structure schematic diagram of a column-type continuous reactor used according to an embodiment of the present disclosure.

Herein, the above drawings include the following reference signs:
11. Feeding section; 111. Liquid inlet; 12. Reacting section; 121. Inert filler; 122. First separating plate; 123. Second separating plate; 13. Discharging section; 131. Liquid-state product outlet; 132. Exhaust port; 14. Porous bottom plate; and 15. Porous top plate.

DETAILED DESCRIPTION OF THE EMBODIMENTS

It should be noted that embodiments in the present application and features in the embodiments may be combined with each other in the case without conflicting. The present disclosure is described in detail below with reference to the drawings and in combination with the embodiments.

As described in the background of the present application, the process of continuously preparing the penem intermediate MAP in the existing technology requires a large amount of the cold source for cooling because the temperature of the cyclization reaction in the first step is higher, so that the energy consumption is higher. In order to solve this problem, the present application provides a continuous preparation method for a penem intermediate MAP. In a typical embodiment, the continuous preparation method comprises: step S1, in a column-type continuous reactor, using a rhodium-loaded catalyst to catalyze 4-nitrobenzyl (R)-2-diazo-4-((2R,3S)-3-((R)-1-hydroxyethyl)-4-oxoazetidin-2-yl)-3-oxopentanoate to generate a cyclization reaction so as to form a first intermediate, wherein the rhodium-loaded catalyst is loaded in the column-type continuous reactor, and the rhodium-loaded catalyst has the following structural formula: $(P-COO)_x Rh_2(OOCR^1)_{4-x}$, wherein R$^1$ represents any one alkyl of C1-C10; P—COO— represents a residue of a polymer after dehydrogenation, and x represents an arbitrary number of 0.1-4.0; step S2, performing an esterification reaction on the first intermediate, a diphenyl chlorophosphate and a diisopropylethylamine in a second continuous reactor, to obtain a product system containing the penem intermediate MAP; and step S3, performing crystallization treatment on the product system, to obtain the penem intermediate MAP.

Main reaction formulas of the cyclization reaction and the esterification reaction of the preparation method are as follows:

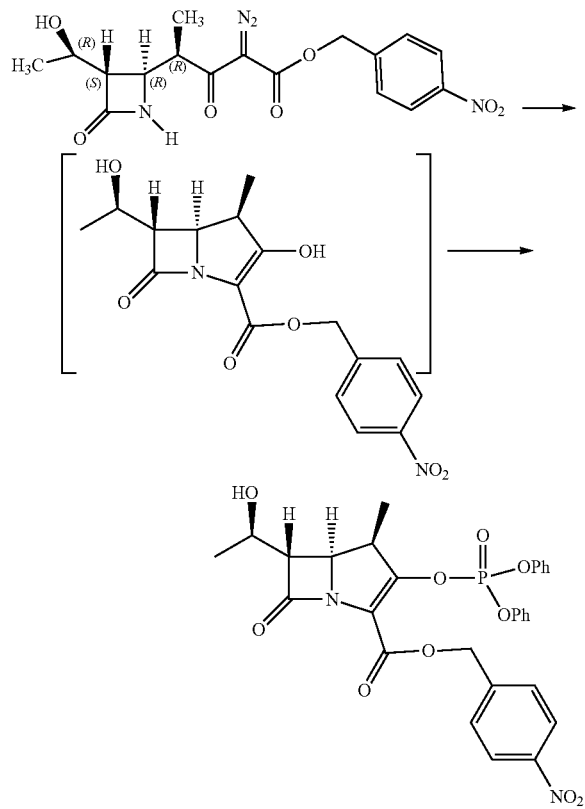

The present application uses the column-type continuous reactor as a place in which the cyclization reaction occurs. Since the cyclization reaction forms the first intermediate while forming a gas-state product, the gas-state product has a disturbing effect on the rhodium-loaded catalyst in a rising process thereof in the column-type continuous reactor, thereby it is beneficial to the efficient contact of 4-nitrobenzyl(R)-2-diazo-4-((2R,3S)-3-((R)-1-hydroxyethyl)-4-oxoazetidin-2-yl)-3-oxopentanoate and the catalyst so as to improve the catalytic effect, and the rhodium-loaded catalyst of the present application uses the polymer as a carrier, so it has higher mechanical properties and catalytic activity, and is easy to recycle. Under the synergistic effect of the column-type continuous reactor and the rhodium-loaded catalyst, the cyclization reaction of the present application may be performed efficiently at a lower temperature, and the temperature difference between the cyclization reaction and the esterification reaction is reduced, thereby a cooling source required for the cooling of the first intermediate is reduced, and the energy consumption is reduced, so it is especially suitable for the industrial application.

Figure 2:
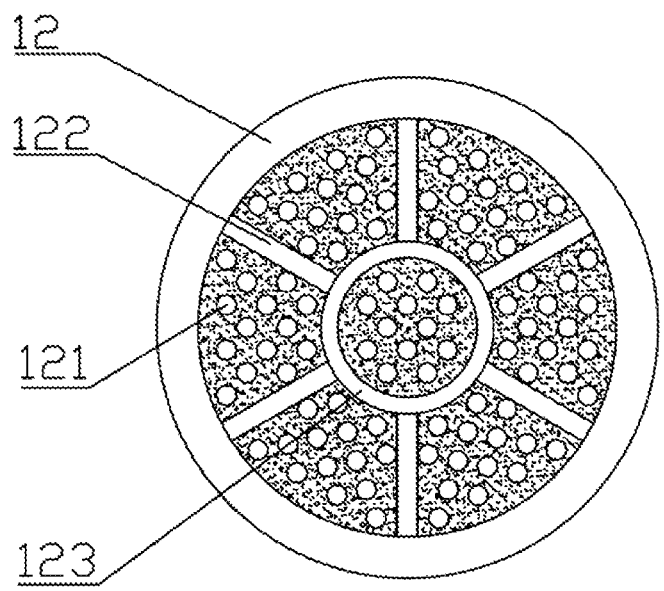
FIG. 2 shows a transverse cross-sectional view of a reacting section of a reacting column of the column-type continuous reactor shown in FIG. 1.

In some embodiments of the present application, as shown in FIGS. 1 and 2, the column-type continuous reactor comprises a reacting column, and installed from bottom to top, the reacting column comprises a feeding section 11, a reacting section 12 and a discharging section 13, the feeding section 11 is provided with a liquid inlet 111, and a liquid distributing device is installed above the liquid inlet 111; the reacting section 12 is isolated from the feeding section 11 through a porous bottom plate 14, the reacting section 12 is internally filled with an inert filler 121 and the rhodium-loaded catalyst and provided with multiple circumferentially arranged first separating plates 122, and each of the first separating plate 122 is extended along a vertical direction so that a cavity of the reacting section 12 is separated to multiple first reacting chambers; and the discharging section 13 is isolated from the reacting section 12 through a porous top plate 15, and the discharging section 13 is provided with a liquid-state product outlet 131 and an exhaust port 132.

The reacting column of the column-type continuous reactor may achieve continuous feeding and discharging, thereby the continuous reaction is achieved; the liquid distributing device is arranged above the liquid inlet 111, so that a reaction material is fed in a uniform manner; the first separating plate 122 arranged in the reacting section 12 divides the reacting cavity into reacting chambers with a small volume, the filler arranged in the reacting chamber disperses the rhodium-loaded catalyst placed in the reacting chamber during the reaction, and a gas by-product is avoided from being upwards flowed to drive the rhodium-loaded catalyst to accumulate upwards so as to cause a problem that a pressure drop in the reacting column is excessive; and while a liquid reaction material enters each reacting chamber, because the volume of the reacting chamber is small, the gas-state by-product produced by the reaction may not be excessively concentrated, as to cause a transitional impact on the filler and the rhodium-loaded catalyst to form a large area of cavities, and the presence of the filler may further prevent the rhodium-loaded catalyst from forming channeling and bypass due to the impact effect, thereby the mass transfer between a liquid phase and a solid phase is uniform during the reaction, the flowing of a gas phase in the liquid phase and the solid phase is also uniform, and the catalytic efficiency of the rhodium-loaded catalyst is improved, so that 4-nitrobenzyl(R)-2-diazo-4-((2R,3S)-3-((R)-1-hydroxyethyl)-4-oxoazetidin-2-yl)-3-oxopentanoate may efficiently perform the cyclization reactions at a lower temperature.

The feeding section 11, the reacting section 12 and the discharging section 13 of the reacting column may be integrally arranged in the reacting column, or the sections may be connected by connecting pieces. In addition, in order to increase the productivity, the column-type continuous reactor may be used in multi-level serially.

Further, preferably as shown in FIG. 2, a second separating plate 123 is further installed in the cavity of the reacting section 12, the second separating plate 123 is a cylinder-like separating plate coaxially installed with the reacting column, the cavity of the reacting section 12 is separated to an inner reacting chamber and an outer reacting chamber by the second separating plate 123, and the first separating plate 122 is installed in the outer reacting chamber so that the outer reacting chamber is separated to multiple the first reacting chambers. Through a combination of the second separating plate 123 and first separating plate 122, the cavity of the reacting section 12 is further separated, so that the mass transfer between the liquid phase and the solid phase is more uniform. Preferably, the second separating plate 123 is the cylinder-like separating plate parallel to a side wall of the reacting section 12. For example, as shown in FIG. 1, the cylinder-like second separating plate 123 is used to combine with the first separating plate 122, so that the formed first reacting chamber does not have a dead corner, the material in each reacting chamber flows more smoothly, and the phase contact is more uniform.

In addition, preferably an inner diameter of the inner reacting chamber is ¼~⅓ of an inner diameter of the reacting section 12. In order to make the volumes of the inner reacting chamber and each first reacting chamber relatively uniform, the reactions in each reacting chamber are relatively synchronized.

In order to maintain a stable pressure drop in each reacting chamber of the reacting column 10, preferably the reacting section 12 adopts a pipeline of DN10-DN800, and a length-to-diameter ratio of the reacting section 12 is 0.05:1-50:1; preferably 0.2:1-20:1.

Preferably, in the structural formula, $R^1$ represents the alkyl of C1-C10, preferably a methyl, an ethyl, a tertiary butyl, an n-hexyl or an n-heptyl, as to reduce the difficulty of the synthesis of a catalyst carrier.

The rhodium-loaded catalyst of the present application may adopt a rhodium-loaded catalyst in an existing technology or adopt a preparation method of the existing technology to prepare the rhodium-loaded catalyst, for example, a rhodium-loaded catalyst disclosed in a patent with a patent number ZL201410459708.3 is adopted or a method thereof is adopted to prepare the rhodium-loaded catalyst.

There are many ways to achieve the cyclization reaction by using the above column-type continuous reactor. Preferably, the step S1 comprises: the 4-nitrobenzyl(R)-2-diazo-4-((2R,3S)-3-((R)-1-hydroxyethyl)-4-oxoazetidin-2-yl)-3-oxopentanoate is dissolved in a first organic solvent so as to form first raw material solution, wherein the first organic solvent is selected from arbitrary one or more from a group of ethyl acetate, methyl acetate, tetrahydrofuran, dichloromethane, trichloromethane and methyl isobutyl ketone. The first raw material solution is formed by using a mode of stirring at 10 to 40° C. The first raw material solution is fed into the column-type continuous reactor, the rhodium-loaded catalyst is used to catalyze the 4-nitrobenzyl(R)-2-diazo-4-((2R,3S)-3-((R)-1-hydroxyethyl)-4-oxoazetidin-2-yl)-3-oxopentanoate to generate the cyclization reaction in 30 to 60° C. so as to form a first intermediate system containing the first intermediate, wherein preferably retention time of the first raw material solution in the column-type continuous reactor is 2 to 40 mins, preferably 4 to 20 mins. The 4-nitrobenzyl(R)-2-diazo-4-((2R,3S)-3-((R)-1-hydroxyethyl)-4-oxoazetidin-2-yl)-3-oxopentanoate is prepared into solution in advance, and sent into the column-type continuous reactor, it is convenient for the control of a cyclization reaction process. The cyclization reaction may occur at 30 to 60° C., it is greatly reduced compared to 80 to 100° C. of the existing technology; and in addition, due to the improvement of the catalytic efficiency, the retention time of the first raw material solution in the column-type continuous reactor may also be relatively shortened, such as in the range of 240 mins, or even it is shortened to the range of 4-20 mins, a higher yield of the first intermediate may be obtained.

Preferably, the content of the 4-nitrobenzyl(R)-2-diazo-4-((2R,3S)-3-((R)-1-hydroxyethyl)-4-oxoazetidin-2-yl)-3-oxopentanoate in the first raw material solution is 0.2 to 0.6 mmol/mL.

In another embodiment of the present application, since the temperature of the esterification reaction is lower, in order to improve the preparation efficiency, preferably the step S2 comprises: pre-cooling the second continuous reactor to −32-12° C.; and respectively feeding the first intermediate system, solution of the diphenyl chlorophosphate and solution of the diisopropylethylamine a into the pre-cooled second continuous reactor to perform the esterification reaction so as to obtain the product system containing the penem intermediate MAP, wherein, the retention time of a reactant in the second continuous reactor is 2-40 mins, preferably 4-20 mins, and preferably a solvent in the solution of the diphenyl chlorophosphate and a solvent in the solution of the diisopropylethylamine are respectively and independently selected arbitrary one or more from a group consist of the ethyl acetate, methyl acetate, tetrahydrofuran, dichloromethane, trichloromethane and methyl isobutyl ketone. The second continuous reactor is pre-cooled to −32~12° C. n advance, so that the material may enter the second continuous reactor (PFR) to quickly enter a reaction state, thereby the preparation efficiency is improved.

In order to simplify an operation, preferably the solvent in the solution of the diphenyl chlorophosphate is the same as the first organic solvent for dissolving the 4-nitrobenzyl(R)-2-diazo-4-((2R,3S)-3-((R)-1-hydroxyethyl)-4-oxoazetidin-2-yl)-3-oxopentanoate. Preferably, the content of diphenyl chlorophosphate in the solution of the diphenyl chlorophosphate is 0.6 to 3.0 mmol/mL; the content of diisopropylethylamine in the solution of diisopropylethylamine is 0.6 to 3.0 mmol/mL. In order to improve a utilization rate of each substance, preferably a flow ratio of the first raw material solution, the first intermediate system, the solution of diphenyl chlorophosphate and the solution of diisopropylethylamine is 1:0.5~2.0:0.1~1.0:0.1~1.0.

The second continuous reactor is a one-level coiler continuous reactor or a multi-level coiler serially-connected continuous reactor. Herein, the multi-level coiler serially-connected continuous reactor may improve the production efficiency. The esterification reaction in the use of the coiler continuous reactor may be applied to a wider temperature range and easier to control, and the retention time may also be relatively shortened to 2-40 mins, or even 4-20 mins.

Before the step S2 is performed, the first intermediate system obtained in step S1 may be collected to a receiving device such as a storage tank or an enamel kettle and pre-cooled to −12~25° C. (preferably −10 to 10° C.), and the receiving device is connected to the column-type continuous reactor and the second continuous reactor, after a certain amount is collected, the reaction in the step S2 is performed to further guarantee the continuity and stability of the process.

The step S3 of the present application is to separate the product MAP by crystallization. A crystallization mode that may be used in the present application may be continuous crystallization or batch crystallization. In one embodiment, the step S3 comprises: feeding the product system, a quenching agent and crystallization liquid into a third continuous reactor for continuous crystallization, to obtain a crystallization system, wherein the quenching agent is selected arbitrary one or more from a group of pure water, potassium dihydrogen phosphate buffer solution, potassium hydrogen phosphate buffer solution, sodium dihydrogen phosphate buffer solution, and sodium hydrogen phosphate buffer solution, and the crystallization liquid is selected arbitrary one or more from a group of hexane, heptane, octane, methyl cyclopentane and petroleum ether; and the crystallization system is subjected to solid-liquid separation, to obtain the penem intermediate MAP. The buffer solution, such as potassium dihydrogen phosphate buffer solution, adopts a conventional mass concentration such as 2-10%.

A continuous crystallization mode may be used to improve the production efficiency. At the beginning of the step S3, the product system and the quenching agent may be sent to the third continuous reactor for quenching, and then the crystallization solution is sent in. During a normal operation, the three are sent at the same time, the feeding speeds of the three may be controlled to control the effect and rate of quenching and crystallization. For example, a flow ratio of the first raw material solution, the control product system, the quenching agent and the crystallization liquid is 1:0.7~4.0:0.5~5.0:0.5~5.0. The third continuous reactor is the one-level coiler continuous reactor or the multi-level coiler serially-connected continuous reactor.

In another embodiment, the step S3 comprises: the product system is sent into the quenching agent for quenching, and then the crystallization liquid is sent into the product system for crystallization, to obtain the crystallization system, herein the quenching agent is selected arbitrary one or more from a group of pure water, potassium dihydrogen phosphate buffer solution, potassium hydrogen phosphate buffer solution, sodium dihydrogen phosphate buffer solution, and sodium hydrogen phosphate buffer solution, and the crystallization liquid is selected arbitrary one or more from a group consist of hexane, heptane, octane, methyl cyclopentane and petroleum ether; and the crystallization system is subjected to the solid-liquid separation, to obtain the penem intermediate MAP. The batch crystallization mode is adopted, and the mode of first quenching and then crystallization is beneficial to improve the efficiency of crystallization and the purity of the product.

The solid-liquid separation modes in the above two embodiments may be filtration, suction filtration or centrifugation, and the specific operating conditions may refer to the existing technology and not be repeatedly described here.

The beneficial effects of the present application are further described below with reference to embodiments and contrast examples.

(1) The 4-nitrobenzyl(R)-2-diazo-4-((2R,3S)-3-((R)-1-hydroxyethyl)-4-oxoazetidin-2-yl)-3-oxopentanoate, diphenyl chlorophosphate, and diisopropylethylamine are each dissolved in ethyl acetate, to obtain the first raw material solution, the solution of diphenyl chlorophosphate, and the solution of diisopropylethylamine respectively; the content of the 4-nitrobenzyl(R)-2-diazo-4-((2R,3S)-3-((R)-1-hydroxyethyl)-4-oxoazetidin-2-yl)-3-oxopentanoate in the first raw material solution is 0.2 to 0.6 mmol/mL; the solution concentration of diphenyl chlorophosphate is 0.6 to 3.0 mmol/mL; and the solution concentration of diisopropylethylamine is 0.6 to 3.0 mmol/mL.

(2) The first raw material solution prepared in the step (1) is pumped into the column-type continuous reactor shown in FIGS. 1 and 2 for reaction. The retention time in the column-type continuous reactor is 2-40 mins, and the reaction temperature is 30-60°, under the catalysis of the rhodium-loaded catalyst, the cyclization reaction takes place to form the first intermediate system containing the first intermediate. The first intermediate system flows out of the column-type continuous reactor and enters the receiving device. The inner diameter of the inner reacting chamber of the column-type continuous reactor is ¼~⅓ of the inner diameter of the reacting section, and the length-to-diameter ratio of the reacting section is 0.05:1-50:1; preferably 0.2: 1-20:1.

(3) The first intermediate system is sent to the multi-level coiler-type continuous reactor; at the same time, the solution of diphenyl chlorophosphate and diisopropylethylamine prepared in the step (1) is sent to the multi-level coiler-type continuous reactor, so that the first intermediate system, the diphenyl chlorophosphate solution, and the diisopropylethylamine solution enter the multi-level coiler-type continuous reactor pre-cooled to −32 to 12° C. for the esterification reaction. The retention time of each reactant in the multi-level coiler-type continuous reactor is 2-40 mins.

(4) Continuous crystallization: the product system flowing out of the multi-level coiler-type continuous reactor is sent to another multi-level tube-type continuous reactor, and 2-10% of the potassium dihydrogen phosphate buffer solution is fed into it for mixing and quenching, and then the heptanes is sent for continuous crystallization, to obtain the crystallization system. The crystallization system flows out of the multi-level coiler-type continuous reactor and then undergoes the centrifugal separation to finally obtain the product penem intermediate MAP ((4R,5R,6S)-3-((diphenoxyphosphinyl)oxy)-6-((1R)-1-hydroxyethyl]-4-methyl-7-oxo-1-azabicyclo(3.2.0)hept-2-ene-2-carboxylic acid (4-nitrophenyl)methyl ester).

Or (4) Batch crystallization: the product system flowing out of the multi-level coiler-type continuous reactor is quenched in 2-10% of the potassium dihydrogen phosphate buffer solution prepared in advance, and then the heptane is added to it for crystallization. The crystallization system is obtained, and the crystallization system undergoes the centrifugal separation to finally obtain the product penem intermediate MAP((4R,5R,6S)-3-((diphenoxyphosphinyl) oxy)-6-((1R)-1-hydroxyethyl)-4-methyl-7-oxo-1-azabicyclo(3.2.0)hept-2-ene-2-carboxylic acid (4-nitrophenyl) methyl ester).

The flow ratio per unit time of the first raw material solution, the first intermediate system, the solution of diphenyl chlorophosphate, the solution of diisopropylethylamine, the product system, the potassium dihydrogen phosphate buffer solution, and the heptane is 1:0.5~2.0:0.1~1.0: 0.1~1.0:0.7~4.0:0.5~5.0:0.5~5.0.

Embodiment 1

The penem intermediate MAP is prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

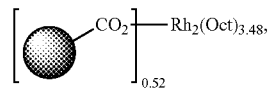

namely a compound 61 in a patent with a patent number ZL 201410459708.3. The retention time of the step (1) was 10 min, the reaction temperature was 40° C., the inner diameter of the inner reacting chamber of the column-type continuous reactor is ⅓ of the inner diameter of the reacting section, and the length-to-diameter ratio of the reacting section is 10:1. In the step (2), the coiler continuous reactor was used, the retention time was controlled to be 10 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 2

The penem intermediate MAP is prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

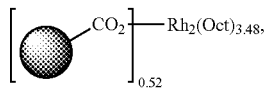

namely a compound 61 in a patent with a patent number 201410459708.3. The retention time of the step (1) was 20 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes is 1:1.0:0.3:0.3:1.6:2.5:3.0.

Embodiment 3

The penem intermediate MAP is prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine is 2.5 mmol/mL. The rhodium-load catalyst was

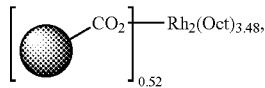

namely a compound 61 in a patent with a patent number ZL201410459708.3. The retention time of the step (1) was 40 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 4

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

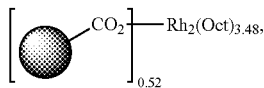

namely a compound 61 in a patent with a patent number ZL201410459708.3. The retention time of the step (1) was 4 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 5

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

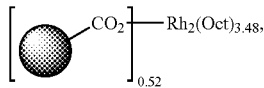

namely a compound 61 in a patent with a patent number ZL201410459708.3. The retention time of the step (1) was 10 min, the reaction temperature was 30° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 6

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

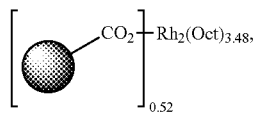

namely a compound 61 in a patent with a patent number ZL201410459708.3. The retention time of the step (1) was 10 min, the reaction temperature was 60° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −5'° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.25:0.25:1.5:2.0:2.5.

Embodiment 7

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

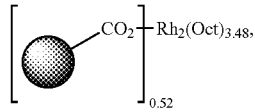

namely a compound 61 in a patent with a patent number ZL201410459708.3. The retention time of the step (1) was 10 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −32° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 8

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

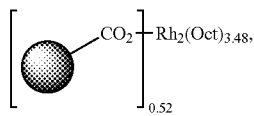

namely a compound 61 in a patent with a patent number ZL201410459708.3. The retention time of the step (1) was 10 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −10° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 9

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

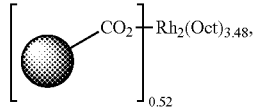

namely a compound 61 in a patent with a patent number ZL201410459708.3. The retention time of the step (1) was 10 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was 12° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 10

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

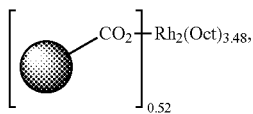

namely a compound 61 in a patent with a patent number ZL201410459708.3. The retention time of the step (1) was 10 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 40 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 11

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

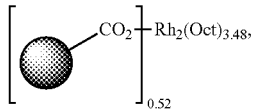

namely a compound 61 in a patent with a patent number ZL201410459708.3. The retention time of the step (1) was 10 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 20 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 12

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

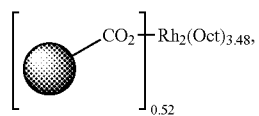

namely a compound 61 in a patent with a patent number ZL201410459708.3. The retention time of the step (1) was 10 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 4 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 13

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.6 mmol/mL; the concentration of diphenyl chlorophosphate was 3.0 mmol/mL; the solution concentration of diisopropylethylamine was 3.0 mmol/mL. The rhodium-load catalyst was

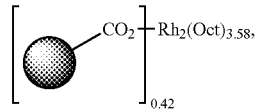

namely a compound 62 in a patent with a patent number ZL201410459708.3. The retention time of the step (1) was 40 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 40 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 14

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.2 mmol/mL; the concentration of diphenyl chlorophosphate was 0.6 mmol/mL; the solution concentration of diisopropylethylamine was 0.6 mmol/mL. The rhodium-load catalyst was

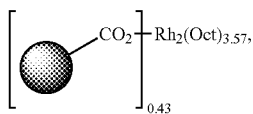

namely a compound 63 in a patent with a patent number ZL201410459708.3. The retention time of the step (1) was 2 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 2 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 15

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

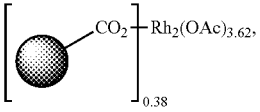

namely a compound 64 in a patent with a patent number ZL201410459708.3. The retention time of the step (1) was 10 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 16

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.5 mmol/mL; the concentration of diphenyl chlorophosphate was 2.5 mmol/mL; the solution concentration of diisopropylethylamine was 2.5 mmol/mL. The rhodium-load catalyst was

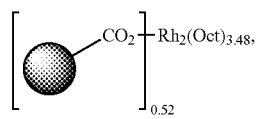

namely a compound 61 in a patent with a patent number ZL201410459708.3. The retention time of the step (1) was 10 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.3:0.3:1.6:2.5:3.0.

Embodiment 17

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.4 mmol/mL; the concentration of diphenyl chlorophosphate was 1.0 mmol/mL; the solution concentration of diisopropylethylamine was 1.0 mmol/mL. The rhodium-load catalyst was

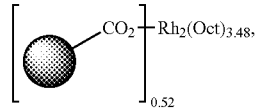

namely a compound 61 in a patent with a patent number ZL201410459708.3. The retention time of the step (1) was 10 min, the reaction temperature was 20° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.4:0.4:1.8:1.6:2.1.

Embodiment 18

The penem intermediate MAP was prepared by the above process, herein, in the step (1), the content of the 4-nitrobenzyl(R)-2-diazo-4-((2R,3S)-3-((R)-1-hydroxyethyl)-4-oxoazetidin-2-yl)-3-oxopentanoate solution was 0.45 mmol/mL; the concentration of diphenyl chlorophosphate was 1.1 mmol/mL; the solution concentration of diisopropylethylamine was 1.1 mmol/mL. The rhodium-load catalyst was

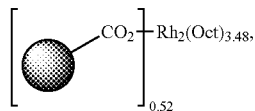

namely a compound 61 in a patent with a patent number ZL201410459708.3. The retention time of the step (1) was 10 min, the reaction temperature was 40° C., the inner diameter of the inner reacting chamber of the column-type continuous reactor was ⅓ of the inner diameter of the reacting section, and the length-to-diameter ratio of the reacting section was 10:1. In the step (2), the coiler continuous reactor was used, the retention time was controlled to be 10 min, and the reaction temperature was −5° C. The concentration of the potassium dihydrogen phosphate buffer solution in the step (3) was 5%. The flow ratio per unit time of the first raw material solution, the first intermediate system, the solution of diphenyl chlorophosphate, the solution of diisopropylethylamine, the product system, the potassium dihydrogen phosphate buffer solution, and the heptanes was 1:1.0:0.4:0.4:1.8:1.8:2.3.

Figure 3:
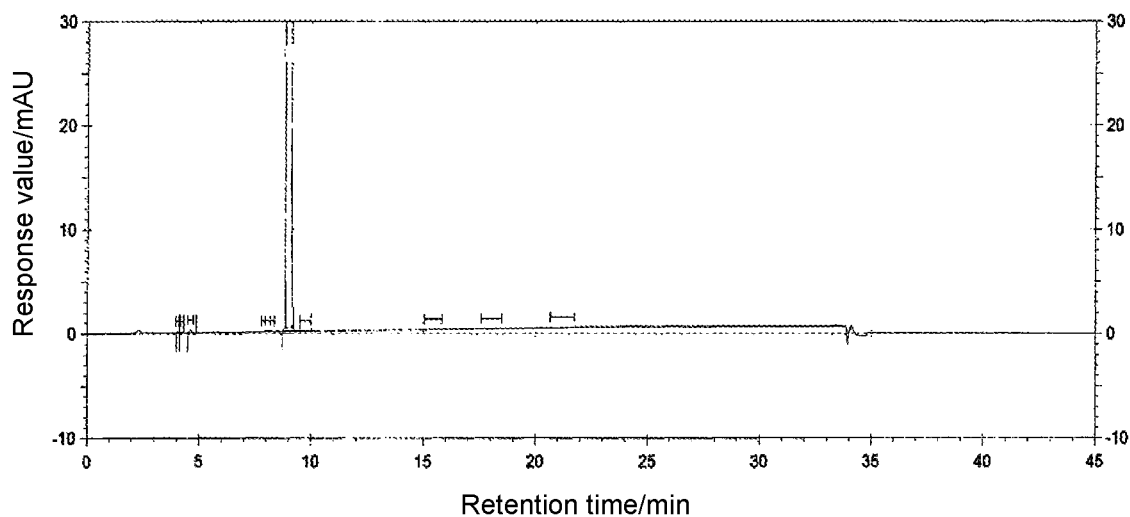
FIG. 3 shows a High Performance Liquid Chromatography (HPLC) spectrum of a purity and content test of a product MAP of Embodiment 18.
Figure 5:
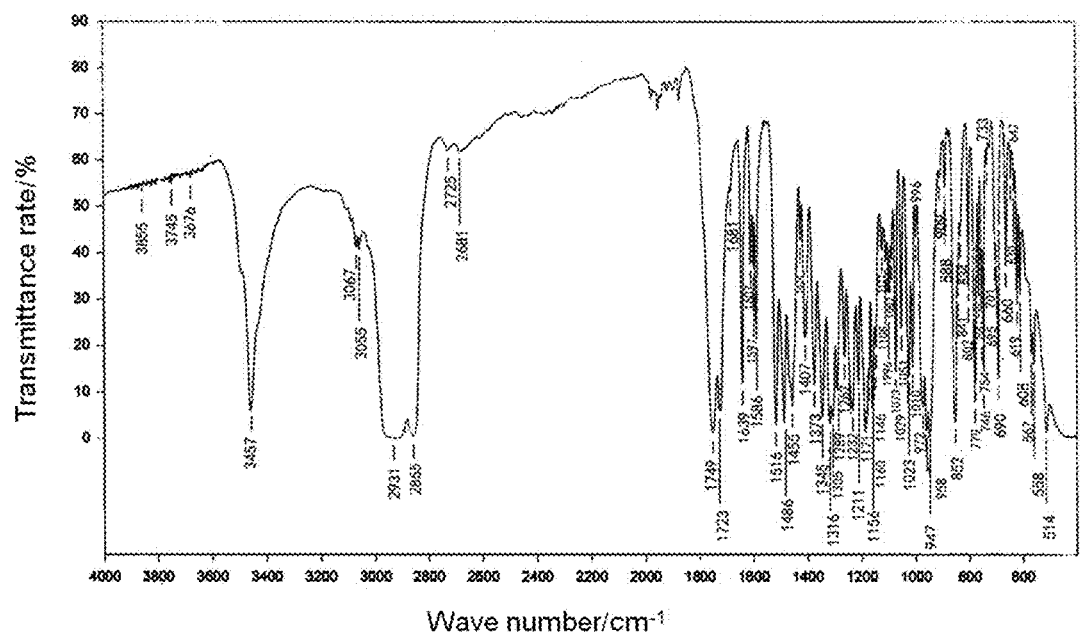
FIG. 5 shows an Infrared Radiation (IR) spectrum of MAP in a product of Embodiment 18.
Figure 6:
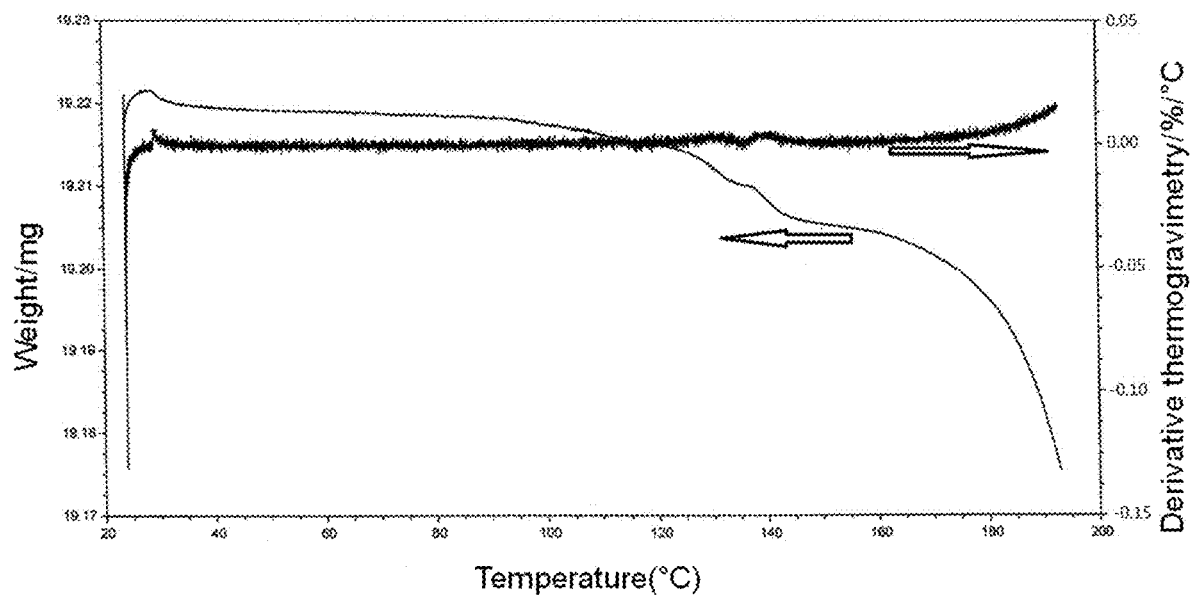
FIG. 6 shows a thermogravimetric analysis spectrum of a product of Embodiment 18.
Figure 7:
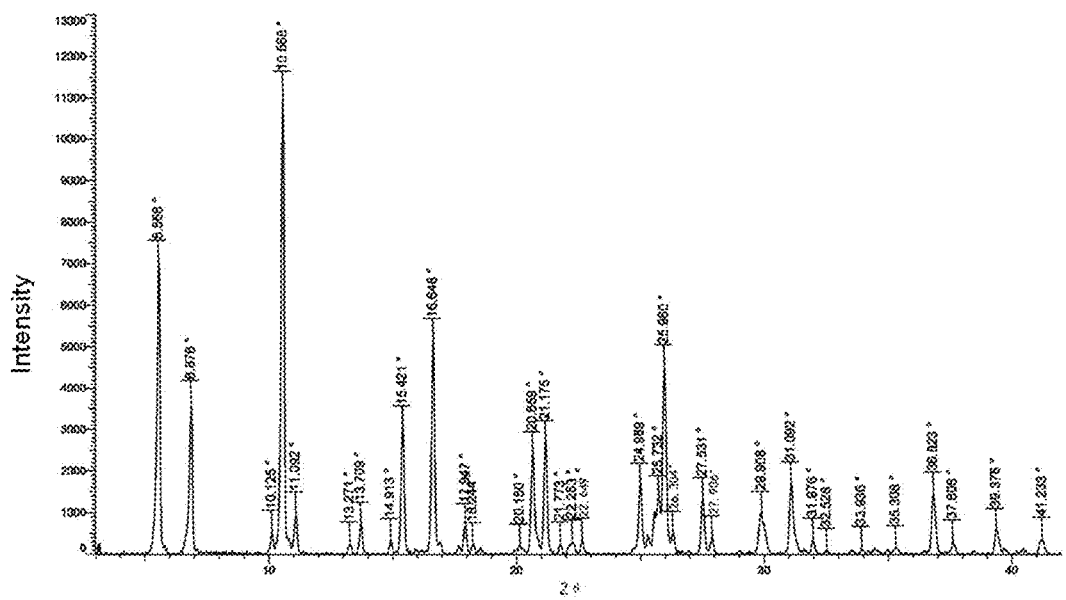
FIG. 7 shows an X-Ray Diffraction (XRD) spectrum of a product of Embodiment 18.
Figure 8:
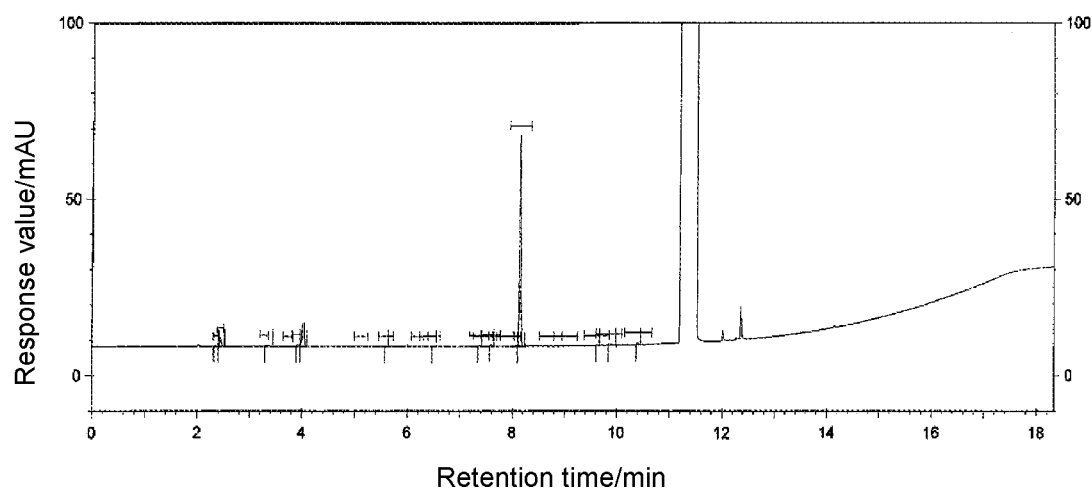
FIG. 8 shows a Gas Chromatography (GC) spectrum of solvent residue detection in a product of Embodiment 18.

The products of the above embodiments are identified, and it is determined that the target product MAP is obtained, and the yield thereof is recorded in Table 4. The product obtained in each embodiment is subjected to HPLC detection to determine purity and isomers, an infrared test is performed on the product to identify the structure thereof, thermogravimetric analysis is performed to further analyze the purity of the product, and X-ray diffraction analysis is performed to determine the crystal structure thereof. A GC test is performed to analyze the residual solvent in the product. Herein, the purity and isomer HPLC test results of Embodiment 18 are shown in FIG. 3 and FIG. 4, the infrared test results are shown in FIG. 5, the thermogravimetric analysis result TG and DTG curves are shown in FIG. 6, the XRD spectrum is shown in FIG. 7, and the GC spectrum is shown in FIG. 8, herein data descriptions corresponding to FIG. 3 is shown in Table 1.

TABLE 1

| Peak number | Retention time/min | Peak height | Peak area | Peak area percentage/% | Name | Relative retention time | Resolution | Asymmetry | Signal to noise ratio |
|---|---|---|---|---|---|---|---|---|---|
| 1 | 4.037 | 1880 | 8996 | 0.0111 | 116662 | 0.45 | 0.0 | 0.0 | 16 |
| 2 | 4.190 | 1388 | 6903 | 0.0086 | 4 | 0.47 | 1.2 | 0.0 | 12 |
| 3 | 4.600 | 4038 | 28120 | 0.0349 | 119905 | 0.51 | 2.7 | 1.4 | 34 |
| 4 | 8.977 | 10995462 | 80640105 | 99.9454 | 119717 | 1.00 | 23.8 | 1.0 | 92789 |

Figure 4:
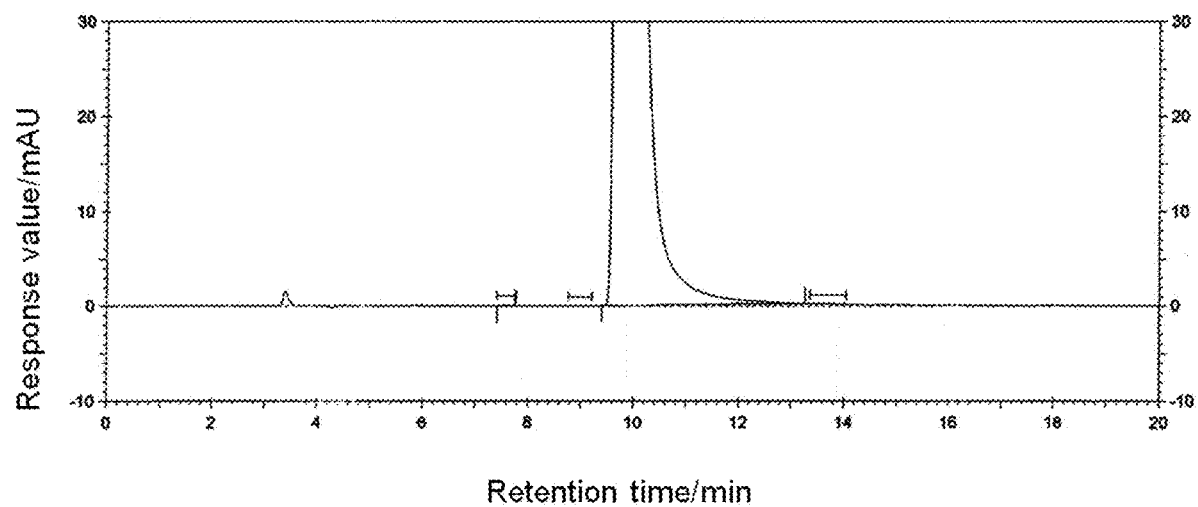
FIG. 4 shows a HPLC spectrum of an α-isomer test in a product of Embodiment 18.

Data descriptions corresponding to FIG. 4 are shown in Table 2.

TABLE 2

| Peak number | Retention time/min | Peak height | Peak area | Peak area percentage/% | Name | Relative retention time | Resolution | Signal to noise ratio |
|---|---|---|---|---|---|---|---|---|
| 1 | 7.557 | 1591 | 15297 | 0.0126 | 1 | 0.78 | 0.0 | 26 |
| 2 | 9.737 | 5483338 | 12172774 | 99.9874 | 119717 | 1.00 | 5.3 | 90634 |

Data descriptions corresponding to FIG. 8 are shown in Table 3.

TABLE 3

| Peak number | Retention time/min | Peak model | Peak height | Peak area | Name | Resolution | Signal to noise ratio |
|---|---|---|---|---|---|---|---|
| 1 | 2.345 | 0.09 | 1747 | 4102 | 1 | 0.0 | 12 |
| 2 | 2.438 | 0.12 | 18982 | 38148 | 14 | 1.6 | 130 |
| 3 | 3.323 | 0.15 | 2752 | 7961 | CAN | 14.9 | 19 |
| 4 | 3.921 | 0.08 | 4312 | 10408 | MeOAC | 8.9 | 29 |
| 5 | 4.019 | 0.13 | 78817 | 206309 | DCM | 1.4 | 538 |
| 6 | 5.590 | 0.07 | 863 | 1721 | n-Hex | 25.0 | 6 |
| 7 | 6.493 | 0.09 | 1120 | 2667 | 5 | 15.1 | 8 |
| 8 | 7.366 | 0.08 | 1519 | 3050 | 6 | 14.9 | 10 |

TABLE 3-continued

| Peak number | Retention time/min | Peak model | Peak height | Peak area | Name | Resolution | Signal to noise ratio |
|---|---|---|---|---|---|---|---|
| 9 | 7.587 | 0.09 | 3581 | 7421 | 8 | 4.0 | 24 |
| 10 | 8.142 | 0.14 | 457705 | 860757 | n-Hep | 10.4 | 3124 |
| 11 | 9.622 | 0.07 | 717 | 1272 | Tol | 0.0 | 5 |
| 12 | 9.858 | 0.14 | 3733 | 11674 | 13 | 0.0 | 25 |
| 13 | 10.407 | 0.08 | 5442 | 9634 | 15 | 8.5 | 37 |

According to the test results in FIG. 6, it may be seen that while heated to 150° C., the weight loss is 0.011 mg, and a weight loss rate is 0.059%.

TABLE 4

| | Yield (%) |
|---|---|
| Embodiment 1 | 87 |
| Embodiment 2 | 85 |
| Embodiment 3 | 88 |
| Embodiment 4 | 86 |
| Embodiment 5 | 87 |
| Embodiment 6 | 83 |
| Embodiment 7 | 85 |
| Embodiment 8 | 88 |
| Embodiment 9 | 85 |
| Embodiment 10 | 87 |
| Embodiment 11 | 85 |
| Embodiment 12 | 86 |
| Embodiment 13 | 89 |
| Embodiment 14 | 87 |
| Embodiment 15 | 85 |
| Embodiment 16 | 86 |
| Embodiment 17 | 81 |
| Embodiment 18 | 87 |

According to the results of the above embodiments, it may be seen that due to the column-type reactor of the present application and the rhodium-load catalyst used, the cyclization reaction in the first step may be performed at the lower temperature (30~60° C.) and the high yield of the final product MAP may also be guaranteed.

It may be seen from the above descriptions that the above embodiments of the present invention achieve the following technical effects.

The present application uses the column-type continuous reactor as a place in which the cyclization reaction occurs. Since the cyclization reaction forms the first intermediate while forming a gas-state product, the gas-state product has a disturbing effect on the rhodium-loaded catalyst in a rising process thereof in the column-type continuous reactor, thereby it is beneficial to the efficient contact of 4-nitrobenzyl(R)-2-diazo-4-((2R,3S)-3-((R)-1-hydroxyethyl)-4-oxoazetidin-2-yl)-3-oxopentanoate and the catalyst so as to improve the catalytic effect, and the rhodium-loaded catalyst of the present application uses the polymer as a carrier, so it has higher mechanical properties and catalytic activity, and is easy to recycle. Under the synergistic effect of the above column-type continuous reactor and the rhodium-loaded catalyst, the cyclization reaction of the present application may be performed efficiently at a lower temperature, and the temperature difference between the cyclization reaction and the esterification reaction is reduced, thereby a cooling source required for the cooling of the first intermediate is reduced, and the energy consumption is reduced, so it is especially suitable for the industrial application.

The above are only preferred embodiments of the present invention, and are not used to limit the present invention. For those skilled in the art, the present invention may have various modifications and changes. Any modifications, equivalent replacements, improvements and the like made within the spirit and principle of the present invention should be included in a scope of protection of the present invention.

What is claimed is:

1. A continuous preparation method for a penem intermediate MAP, comprising:

step S1, in a column-type continuous reactor, using a rhodium-loaded catalyst to catalyze 4-nitrobenzyl(R)-2-diazo-4-((2R,3S)-3-((R)-1-hydroxyethyl)-4-oxoazetidin-2-yl)-3-oxopentanoateto generate a cyclization reaction so as to form a first intermediate, wherein the rhodium-loaded catalyst is loaded in the column-type continuous reactor, and the rhodium-loaded catalyst has the following structural formula:

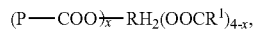

wherein $R^1$ represents any one alkyl of C1-C10; P—COO— represents a residue of a polymer after dehydrogenation, and x represents an arbitrary number of 0.1-4.0;

step S2, performing an esterification reaction on the first intermediate, a diphenyl chlorophosphate and a diisopropylethylamine in a second continuous reactor, to obtain a product system containing the penem intermediate MAP; and step S3, feeding the product system, a quenching agent and crystallization liquid into a third continuous reactor to perform continuous crystallization, to obtain a crystallization system, wherein the quenching agent is selected arbitrary one or more from a group of pure water, potassium dihydrogen phosphate buffer solution, potassium hydrogen phosphate buffer solution, sodium dihydrogen phosphate buffer solution, and sodium hydrogen phosphate buffer solution, and the crystallization liquid is selected arbitrary one or more from a group consist of hexane, heptane, octane, methyl cyclopentane and petroleum ether; and performing solid-liquid separation on the crystallization system, to obtain the penem intermediate MAP;

wherein the third continuous reactor is a one-level coiler continuous reactor or a multi-level coiler serially-connected continuous reactor; and the formula of the penem intermediate MAP is:

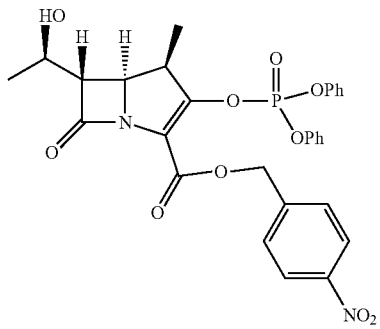 [SMILES: C[C@@H](O)[C@H]1C(=O)N2C(C(=O)OCc3ccc([N+](=O)[O-])cc3)=C(OP(=O)(Oc3ccccc3)Oc3ccccc3)[C@H](C)[C@H]12]

2. The continuous preparation method according to claim 1, wherein the column-type continuous reactor comprises a reacting column, and installed from bottom to top, the reacting column comprises:
a feeding section, provided with a liquid inlet, and a liquid distributing device is installed above the liquid inlet;
a reacting section, wherein the reacting section is isolated from the feeding section through a porous bottom plate (14), the reacting section is internally filled with an inert filler and the rhodium-loaded catalyst and provided with multiple circumferentially arranged first separating plates, and each of the first separating plates is extended along a vertical direction so that a cavity of the reacting section is separated to multiple first reacting chambers; and
a discharging section, wherein the discharging section is isolated from the reacting section through a porous top plate, and the discharging section is provided with a liquid-state product outlet and an exhaust port.

3. The continuous preparation method according to claim 2, wherein a second separating plate is further installed in the cavity of the reacting section, the second separating plate is a cylinder-like separating plate coaxially installed with the reacting column, the cavity of the reacting section is separated to an inner reacting chamber and an outer reacting chamber by the second separating plate, and the first separating plate is installed in the outer reacting chamber so that the outer reacting chamber is separated to the multiple first reacting chambers.

4. The continuous preparation method according to claim 1, wherein in the structural formula, $R^1$ represents the alkyl of C1-C10, preferably a methyl, an ethyl, a tertiary butyl, an n-hexyl or an n-heptyl.

5. The continuous preparation method according to claim 2, wherein the step S1 comprises:
enabling the 4-nitrobenzyl(R)-2-diazo-4-((2R,3S)-3-((R)-1-hydroxyethyl)-4-oxoazetidin-2-yl)-3-oxopentanoate to be dissolved in a first organic solvent so as to form first raw material solution, wherein the first organic solvent is selected arbitrary one or more from a group of ethyl acetate, methyl acetate, tetrahydrofuran, dichloromethane, trichloromethane and methyl isobutyl ketone; and
feeding the first raw material solution into the column-type continuous reactor, using the rhodium-loaded catalyst to catalyze the 4-nitrobenzyl(R)-2-diazo-4-((2R,3S)-3-((R)-1-hydroxyethyl)-4-oxoazetidin-2-yl)-3-oxopentanoate to generate the cyclization reaction in 30-60° C. so as to form a first intermediate system containing the first intermediate, wherein preferably retention time of the first raw material solution in the column-type continuous reactor is 2-40 mins, preferably 4-20 mins.

6. The continuous preparation method according to claim 1, wherein the step S2 comprises:
pre-cooling the second continuous reactor to −32-12° C.; and
respectively feeding the first intermediate system, solution of the diphenyl chlorophosphate and solution of the diisopropylethylamine into the pre-cooled second continuous reactor to perform the esterification reaction so as to obtain the product system containing the penem intermediate MAP, wherein a solvent in the solution of the diphenyl chlorophosphate and a solvent in the solution of the diisopropylethylamine are respectively and independently selected arbitrary one or more from a group consist of the ethyl acetate, methyl acetate, tetrahydrofuran, dichloromethane, trichloromethane and methyl isobutyl ketone, before performing the step S2, preferably enabling the first intermediate system obtained in the step S1 to be collected to a receiving device and pre-cooling to −12-25° C., wherein the receiving device is connected with the column-type continuous reactor and the second continuous reactor.

7. The continuous preparation method according to claim 1, wherein the second continuous reactor is a one-level coiler continuous reactor or a multi-level coiler serially-connected continuous reactor, and the retention time of a reactant in the second continuous reactor is 2-40 mins, preferably 4-20 mins.

8. The continuous preparation method according to claim 1, wherein the step S3 comprises:
after feeding the product system into a quenching agent for quenching, feeding a crystallization liquid into the product system to perform the crystallization, to obtain a crystallization system, wherein the quenching agent is selected arbitrary one or more from a group consist of pure water, potassium dihydrogen phosphate buffer solution, potassium hydrogen phosphate buffer solution, sodium dihydrogen phosphate buffer solution, and sodium hydrogen phosphate buffer solution, and the crystallization liquid is selected arbitrary one or more from a group of hexane, heptane, octane, methyl cyclopentane and petroleum ether; and
performing solid-liquid separation on the crystallization system, to obtain the penem intermediate MAP.

* * * * *